United States Patent
Vendelbo

(10) Patent No.: US 11,349,642 B2
(45) Date of Patent: May 31, 2022

(54) HEARING DEVICE SYSTEM, DEVICES AND METHOD OF CREATING A TRUSTED BOND BETWEEN A HEARING DEVICE AND A USER ACCESSORY DEVICE

(71) Applicant: GN HEARING A/S, Ballerup (DK)

(72) Inventor: Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 14 days.

(21) Appl. No.: 16/820,664

(22) Filed: Mar. 16, 2020

(65) Prior Publication Data

US 2020/0313868 A1 Oct. 1, 2020

(30) Foreign Application Priority Data

Apr. 1, 2019 (EP) .................................... 19166471

(51) Int. Cl.
*H04L 9/08* (2006.01)
*H04L 9/32* (2006.01)
(Continued)

(52) U.S. Cl.
CPC .......... *H04L 9/0819* (2013.01); *H04L 9/0894* (2013.01); *H04L 9/3242* (2013.01); *H04W 12/037* (2021.01); *H04W 12/06* (2013.01)

(58) Field of Classification Search
CPC ....... H04L 9/08; H04L 9/0819; H04L 9/0894; H04L 9/32; H04L 9/3242; H04L 9/0866;
(Continued)

(56) References Cited

U.S. PATENT DOCUMENTS

| 8,166,312 B2 * | 4/2012 | Waldmann ............. H04R 25/70 713/189 |
| 10,104,522 B2 | 10/2018 | Pedersen et al. |

(Continued)

FOREIGN PATENT DOCUMENTS

| DE | 10147811 C1 | 6/2003 |
| EP | 2183928 B1 | 1/2011 |

(Continued)

OTHER PUBLICATIONS

"How To Set Up The Touch Control App Using QR Code For Android", YouTube Video, URL: https://www.youtube.com/watch?v=9Wk3BFkTvlc (no document attached).

*Primary Examiner* — Shaqueal D Wade-Wright
(74) *Attorney, Agent, or Firm* — Vista IP Law Group, LLP

(57) ABSTRACT

The present disclosure relates to a method of creating a trusted bond between a hearing device and a user accessory device, wherein the method comprises: transmitting, by a hearing device fitting system, an authentication key to the hearing device; creating, by the hearing device fitting system authentication data comprising the authentication key in encrypted form; obtaining, by the user accessory device, the created authentication data; receiving, by the user accessory device, identification information from the hearing device the identification information identifying the hearing device; decrypting, by the user accessory device, the encrypted authentication key comprised in the obtained authentication data using at least the received identification information; establishing communication between the hearing device and the user accessory device based on the authentication key.

20 Claims, 4 Drawing Sheets

(51) Int. Cl.
*H04W 12/06* (2021.01)
*H04W 12/037* (2021.01)

(58) Field of Classification Search
CPC ... H04L 9/3236; H04L 63/08; H04L 63/0428; H04L 63/0435; H04L 63/0876; H04L 63/12; H04L 63/123; H04W 12/06
See application file for complete search history.

(56) References Cited

U.S. PATENT DOCUMENTS

| | | | |
|---|---|---|---|
| 10,187,733 | B2 | 1/2019 | Schneider et al. |
| 10,783,996 | B2 * | 9/2020 | Westermann ......... H04W 12/06 |
| 2009/0010463 | A1 * | 1/2009 | Boretzki ............... H04R 25/70 |
| | | | 381/312 |
| 2017/0006029 | A1 * | 1/2017 | Pedersen ................. H04W 4/80 |
| 2017/0324390 | A1 | 11/2017 | Wheatley et al. |
| 2018/0124527 | A1 | 5/2018 | El-hoiydi et al. |
| 2018/0167809 | A1 * | 6/2018 | Vendelbo ............. H04R 25/558 |
| 2019/0379644 | A1 * | 12/2019 | Schneider ............. H04R 25/70 |
| 2020/0120430 | A1 * | 4/2020 | Perscheid ............. H04R 25/30 |

FOREIGN PATENT DOCUMENTS

| EP | 3410666 A1 | 12/2018 |
|---|---|---|
| WO | WO 2007/144435 A2 | 12/2007 |
| WO | WO 2015/132419 A2 | 9/2015 |

* cited by examiner

HEARING DEVICE SYSTEM, DEVICES AND METHOD OF CREATING A TRUSTED BOND BETWEEN A HEARING DEVICE AND A USER ACCESSORY DEVICE

RELATED APPLICATION DATA

This application claims priority to, and the benefit of, European Patent Application No. 19166471.3 filed on Apr. 1, 2019. The entire disclosure of the above application is expressly incorporated by reference herein.

TECHNICAL FIELD

The present disclosure relates to a hearing device system comprising a hearing device and a user accessory device. In particular, the present disclosure relates to methods and devices for creating a trusted bond between entities of a hearing device system.

BACKGROUND

Wireless communication to and from different entities of a hearing device system has been increasing as new hearing device technologies and functionalities have been developed involving wireless communication technology. However, the new technologies entail new challenges for hearing device manufacturers in order to secure communication in a hearing device system. Wireless communication interfaces of a hearing device system often use interfaces that are based on open standards. However, this poses many challenges in terms of security.

It is generally desirable to provide an easy, efficient, and secure way of establishing a trusted bond between a user accessory device and a hearing device.

EP3410666 discloses a method, performed in a user application, of creating a trusted bond between a hearing device and the user application, wherein the method comprises obtaining first authentication material; transmitting a first authentication request comprising a first authentication type identifier and first authentication data to the hearing device; receiving an authentication response comprising an authentication key identifier; storing an authentication key and the authentication key identifier, wherein the authentication key is based on the first authentication material; and connecting the user application to the hearing device using the authentication key and the authentication key identifier.

It is desirable to provide an improved method of creating a trusted bond between a hearing device and a user accessory device and/or to provide an alternative to prior art methods.

SUMMARY

According to a first aspect, disclosed herein are embodiments of a method of creating a trusted bond between a hearing device and a user accessory device, wherein the method comprises:

transmitting, by a hearing device fitting system, an authentication key to the hearing device;

creating, by the hearing device fitting system, authentication data comprising the authentication key in encrypted form;

obtaining, by the user accessory device, the created authentication data;

receiving, by the user accessory device, identification information from the hearing device, the identification information identifying the hearing device;

decrypting, by the user accessory device, the encrypted authentication key comprised in the obtained authentication data using at least the received identification information;

establishing communication between the hearing device and the user accessory device based on the authentication key.

Embodiments of the process described herein provide a fast and user-friendly mechanism that only requires minimal user interaction. In particular, the user does not need to directly interact with the hearing device or manually enter any passcodes. For example, there is no need for the user to remove the hearing device from the ear and to power the hearing device off and on. Accordingly, the hearing device may be able to continue to provide its hearing-loss compensation function and/or other functions while the trusted bond is established. The reduced need for user interaction with the hearing device is particularly interesting because hearing devices are typically very small and their user interface may be difficult to operate, in particular for users having reduced eyesight, reduced dexterity or users suffering from other impairments.

Moreover, as the creation of the trusted bond does not rely on an exchange of authentication messages such as challenges and responses between the hearing device and the user accessory device, the process is only little prone to errors and suitable even for users who are not technology minded. Nevertheless, as the user accessory device uses identification information identifying the particular hearing device for decrypting the authentication key and since the user accessory device needs access to the authentication data, the process is sufficiently secure. Moreover, as the process involves a hearing device fitting system, different from the user accessory device, the security of the system is further increased.

In particular, hearing devices such as hearing aids are typically provided to the end-user by hearing care professionals (HCPs) who have access to a hearing device fitting system and who configure the hearing device to the particular end-user. Embodiments of the method disclosed herein use a hearing device fitting system to facilitate the establishment of the shared key. In particular, when operated by an HCP, the hearing device fitting system and the HCP operating it can be regarded a trusted entity that knows who the intended user of a hearing device is.

The hearing device fitting system may be or comprise a suitably programmed data processing system, e.g. a handheld device, a relay, a tablet, a personal computer, a mobile phone, and/or USB dongle plugged in a personal computer. The hearing device fitting system may be configured to execute a fitting software comprising program code configured to cause the hearing device fitting system to perform acts of the process described herein, in particular the transmission of the authentication code to the hearing device and the creation of the authentication data. The hearing device fitting system may be configured to communicate with the hearing device and to configure operational parameters of the hearing device so as to configure the hearing device for a particular hearing device user. This process is also referred to as "fitting". The operational parameters may comprise fitting parameters such as hearing loss parameters, compressor parameters, filter coefficients, and/or gain coefficients. Other operational parameters may include volume control parameters, mode and/or program control parameters etc. The fitting parameters may for example be data generated by the hearing device fitting system used by an HCP when a hearing device is being fitted in a user's ear. In some embodiments, the authentication data and/or some or all of the operational parameters are stored in the hearing device at the time of manufacturing of the hearing device. In such an embodiment, the authentication data may be created and provided in a machine readable form, e.g. as a printed QR code, at the time of manufacturing the hearing aid and shipped together with the hearing aid. Accordingly, in some embodiments, the hearing device fitting system may be part of the hearing aid manufacturing system. The configuration of the operational parameters may comprise transmitting parameter values for one or more operational parameters by the hearing device fitting system to the hearing device for storage of the parameter values in a memory of the hearing device.

The transmitted authentication key may be transmitted to the hearing device and stored in a memory of the hearing device, e.g. in a manner similar to the transmitting and storing of operational parameters. The transmission of the authentication key may thus be performed as a part of a fitting process.

The transmission of the authentication key and, optionally of other fitting parameters from the hearing device fitting system to the hearing device may be via a suitable communications link. Accordingly, the hearing device may be configured to connect to the hearing device fitting system via a communications link, such as a bidirectional communications link. The communications link may be a wired link and/or wireless communications link. The communications link may be a single hop communications link or a multi hop communications link. According to some embodiments, the wireless communications link may utilise radio-frequency communication, e.g. using one or more frequency bands located in the industrial scientific medical (ISM) radio frequency range such as in the 2.40-2.50 GHz band or the 902-928 MHz band. The wireless communication may alternatively use another suitable frequency band. The wireless communications link may be carried over a short-range communications system, such as Bluetooth, Bluetooth low energy, IEEE 802.11, Zigbee or the like. The hearing device may be configured to connect to the hearing device fitting system over a network. The hearing device fitting system may permit remote fitting of the hearing device where an HCP connects to the hearing device via a hearing device fitting system of the user. The hearing device fitting system may include more than one computer, e.g. a client terminal communicatively connected to a server computer.

The communication between the hearing device fitting system and the hearing device may be encrypted and/or involve cryptographic authentication, e.g. as described in U.S. Pat. No. 10,104,522.

Similarly, the creation of the authentication data may be performed as a part of the fitting process or subsequent thereto.

The authentication key may be a shared secret, shared by the hearing device and the user accessory device. The authentication key may be a cryptographic authentication key of a cryptographic authentication process. The authentication key may be device-specific, i.e. unique for a particular hearing device.

The hearing device fitting system may create the authentication key or receive it from a remote host system, e.g. a host system operated by the hearing device manufacturer. In some embodiments, the hearing device fitting system creates the authentication key based on data received by the manufacturer.

In some embodiments, the hearing device fitting system may further control or request the hearing device to enter an operational mode where the hearing device is connectable with a user accessory device, e.g. where the hearing device broadcasts messages including identification information. In some embodiments, the hearing device fitting system may further control or request the hearing device to broadcast messages including identification information at an increased rate and/or with increased power higher than a default rate/power. The hearing device may broadcast such messages or broadcast such messages at an increased rate and/or power for a predetermined period of time and/or until a user accessory device has established a communications link with the hearing device. Once the user accessory device has established an initial communications link with the hearing device, the hearing device may leave the operational mode until the user again controls it to be connectable. Alternatively or additionally, once the user accessory device has established an initial communications link with the hearing device the hearing device may change the broadcast rate and/or power to a default value.

In some embodiments, the hearing device may be configured to store multiple authentication keys, each having associated a respective authentication key index. The authentication key index may be an identifier identifying one of a plurality of storage locations where the hearing device is configured to store respective authentication keys. The authentication key index may be configured to allow the authentication keys stored by the hearing device to be uniquely distinguished from each other. Accordingly, the hearing device may be capable of selectively communicating with a selected one of multiple user accessory devices where the hearing device has stored thereon respective authentication keys associated with the different user accessory devices. Upon receipt of the authentication key from the hearing device fitting system, the hearing device may store the received authentication key in association with an authentication key index. The hearing device may return the authentication key index associated with the authentication key to the hearing device fitting system. Alternatively, the hearing device fitting system may obtain information about the authentication key index associated with the stored authentication key in a different manner. For example, the hearing device fitting system may initially request the hearing device to identify which empty storage locations are available for storage of the transmitted authentication key, e.g. by identifying the available key authentication indices. The hearing device fitting system may then select an available authentication key index and request the hearing device to store the transmitted authentication key in association with the selected authentication key index. The hearing device fitting system may even provide additional functionality for managing the authentication keys stored by the hearing device, e.g. to delete existing authentication keys so as to make a storage location available for storage of a new authentication key.

The authentication data created by the hearing device fitting system may comprise the authentication key index, e.g. in encrypted form, e.g. encrypted using the identification information identifying the hearing device. During establishment of a communications link between a user accessory device and the hearing device, the hearing device may use the authentication key index to select one of the stored authentication keys. To this end the authentication key index may be communicated between the user accessory device and the hearing device during establishment of the communications link.

The identification information identifying the hearing device may be a hearing device identifier. In some embodiments, the hearing device broadcasts or otherwise communicates the hearing device identifier when it is available for establishing a connection, i.e. prior to establishing a communications link between the hearing device and the user accessory device. This allows other devices, such as the user accessory device, to find and connect to the hearing device. Accordingly, the user accessory device can, upon receipt of the hearing device identifier select to establish communication with the identified hearing device, i.e. to establish a wireless communication link with the hearing device. To this end, if a trusted bond between the hearing device and the user accessory device has previously been established, the user accessory device may send a connection request message to the hearing device, requesting establishment of a communications link on the basis of the established trusted bond. The request may include the authentication key index associated with the corresponding authentication key to be used to verify the existence of the trusted bond. If, on the other hand, a trusted bond has not yet been established between the hearing device and the user accessory device, the user accessory device may process the authentication data using the identification information of the hearing device so as to complete the establishment of the trusted bond as described herein.

As used herein the term "identifier" refers to a data item suitable for identifying another entity, such as for categorizing, and/or uniquely identifying. The identifier may be in a form of a word, a number, a letter, a symbol, a list, an array, or any combination thereof. For example, the identifier as a number may be in the form of an integer, such as unsigned integer, unit, with a length of e.g. 8 bits, 13 bits, 32 bits, or more, such as an array of unsigned integers. An identifier may have a length of several bytes. For example, a hearing device identifier may have a length of 20 bytes.

The authentication data may further comprise identifier verification data configured to allow the user accessory device to verify whether the identification information received from a hearing device matches the authentication data, i.e. pertains to the same hearing device as the authentication data. For example, the identifier verification data may comprise a result value of a cryptographic hash function of an input that includes at least a part of the identification information. For the purpose of the present description, the result value of a cryptographic hash function will also be referred to as hash value. The input to the cryptographic hash function may include the hearing device identifier and, optionally, an additional byte sequence. Accordingly, the user accessory device may determine whether the hearing device identified by the received identification information indeed is the hearing device to which the authentication data pertains. This may be particularly useful when multiple hearing devices are within the communication range of the user accessory device when the user accessory device is about to establish a trusted bond to a particular hearing device. More particular, the authentication data does not need to include identification information that may allow an unauthorized person to readily identify which hearing device the authentication data pertains to.

The additional byte sequence may be a predetermined static string and/or a variable string such as a device-specific string and/or a key or data item stored on the device and known only to the hearing device manufacturer. In some embodiments, the additional byte sequence includes a device-specific secret or other device-specific data which is specific to the hearing device. Generally, a static string may be a predetermined string of characters, such as from 4 to 13 characters or having another suitable length. More generally, a static string may be a sequence of bytes, e.g. between 4 to 13 bytes or having another suitable length.

The verification data included in the authentication data may be created by the hearing device fitting system or by the hearing device. In particular, when the additional byte sequence includes a device-specific secret stored in the hearing device, the hearing device may create the result value of the cryptographic hash function and transmit it to the hearing device fitting system for inclusion as verification data into the authentication data.

In some embodiments, the user accessory device is configured to verify, based on the received identification information and the identifier verification data that the obtained authentication data pertains to the received identification information and to decrypt the authentication key so as to complete establishment of the trusted bond only upon successful verification.

The verification may e.g. comprise:
computing the result value of the cryptographic hash function of an input that includes at least a part of the received identification information,
comparing the computed result value with the identifier verification data, and
determining that the verification is successful only when the computed result value is equal to the identifier verification data.

To this end, when the cryptographic hash function receives an additional byte sequence in addition to the identification information, the additional byte sequence may be stored in the user accessory device, e.g. as part of a user application executed on the user accessory device, or it may be received by the user accessory device from a remote host system.

The encrypted authentication key included in the authentication data may be configured to be decrypted using a decryption key that depends on the identification information. To this end, the authentication key comprised in the authentication data in encrypted form may be encrypted using the identification information identifying the hearing device or otherwise encrypted such that decryption of the authentication key requires knowledge of the identification information identifying the hearing device. In particular the identification information used to encrypt the authentication key may be the same, or at least a part of, the identification information received by the user accessory device. For example the decryption key may be a result value of a cryptographic hash function computed from an input that includes at least a part of the identification information, e.g. from an input that includes the hearing device identifier and, optionally, a second predetermined static string which may be different from the first predetermined static string. Accordingly, the authentication key can only be decrypted and used by the user accessory device if the user accessory device has identified the correct hearing device, i.e. when the user accessory device is (or has been) in a sufficient proximity to the hearing device to receive the identification information.

In some embodiments, the authentication data may include additional and/or alternative information. For example, in some embodiments, the authentication data may include version information indicative of a version of the data format of the authentication data, thus facilitating compatibility of the user accessory device with different versions of authentication data formats. To this end, the user accessory device may extract the version information from the received authentication data and process the remaining contents of the authentication data dependent on the version information.

Alternatively or additionally, the authentication data may include type or brand information indicative of a type or brand of hearing device to which the authentication data pertains. The type or brand information may be indicative of a hearing device brand, of a hearing device manufacturer, of a particular version of hearing device, and/or the like. Accordingly, the authentication data may support different types of hearing devices that may require different data formats different encryption algorithms and/or the like.

Alternatively or additionally, the authentication data may include information identifying a user application to be installed on the user accessory device. The authentication data may even include a link to an app store or other source from which the user application may be retrieved. Accordingly, upon obtaining the authentication data, the user accessory device may automatically initiate retrieval and/or installation and/or execution of the user application. Moreover, upon obtaining the authentication data, the user application may automatically invoked and/or automatically process the authentication data as described herein so as to be able to establish communication with the hearing device The hearing device fitting system may provide the created authentication data in any suitable form readable by the user accessory device. In some embodiments, the hearing device fitting system creates and provides the authentication data as a machine-readable representation of the authentication data. Obtaining the authentication data by the user accessory device may thus comprise reading the machine-readable representation and extracting the authentication data from the machine-readable representation.

It will be appreciated that the machine-readable representation may include more than one set of authentication data, e.g. respective sets of authentication data for two hearing devices, e.g. for each of a pair of hearing devices to be worn in or at respective ears of the user, e.g. authentication data for a binaural hearing aid.

The authentication data may be device-specific to a particular user accessory device or it may be generic, i.e. configured to be used by more than one user accessory device.

The communication between the user accessory device and the hearing device may be via a suitable communications link, such as a bidirectional communications link. The communications link may be a wired link and/or wireless communications link. The communications link may be a single hop communications link or a multi hop communications link. According to some embodiments, the wireless communications link may utilise radio-frequency communication, e.g. using one or more frequency bands located in the industrial scientific medical (ISM) radio frequency range such as in the 2.40-2.50 GHz band or the 902-928 MHz band. The wireless communication may alternatively use another suitable frequency band. The wireless communications link may be carried over a short-range communications system, such as Bluetooth, Bluetooth low energy, IEEE 802.11, Zigbee or the like. The hearing device may be configured to connect to the user accessory device over a network. In some embodiments, the wireless communications link may be a Bluetooth communications link, such as a Bluetooth LE communications link.

Accordingly, in some embodiments, receiving, by the user accessory device, identification information from the hearing device comprises receiving, by the user accessory device, the identification information from the hearing device, when the hearing device is within a communication range of the user accessory device, in particular a communication range for wireless communication. Accordingly, in order for the user accessory device to be able to decrypt the authentication key, the user accessory device has to be brought within communication range of the hearing device to which the authentication data pertains.

Establishing a communications link between the user accessory device and the hearing device may comprise cryptographically protecting the communications link based on the authentication key. Cryptographically protecting the communications link may comprise one or more of the following: cryptographically authenticating the user accessory device by the hearing device, cryptographically authenticating the hearing device by the user accessory device, establishing an encryption key and/or a decryption key for encrypting/decrypting the data communicated via the communications link.

Communication between the user accessory device and the hearing device may be used to communicate audio data between the hearing device and the user accessory device, e.g. for using the hearing device as an audio output device by the user accessory device. Alternatively or additionally, the user accessory device may communicate control data to the hearing device, e.g. for adjusting a volume, selecting a program/mode of the hearing device and/or the like.

A cryptographic hash function for use in embodiments of the method described herein may be any hash function suitable for cryptography, in particular a one-way function, i.e. a function which is infeasible to invert, meaning that inverting the function would in practice take too many resources to be useful. Examples of suitable cryptographic hash functions include SHA-1, SHA-2, SHA-3, MD5.

The user accessory device may comprise a processing unit, such as a central processing unit. The user accessory device may further comprise a memory unit and a communications interface respectively connected to the processing unit. The memory unit may include one or more removable and/or non-removable data storage units including, but not limited to, Read Only Memory (ROM), Random Access Memory (RAM), etc. The memory unit may have a user application stored thereon, the user application comprising program code for causing the user accessory device to perform acts of the method described herein, in particular the receiving of the identification information from the hearing device, the decryption of the encrypted authentication key comprised in the authentication data and the establishment of communication between the hearing device and the user accessory device. The communications interface may comprise an antenna and a wireless transceiver, e.g. configured for wireless communication at frequencies in the range from 2.4 to 2.5 GHz. The communications interface may be configured for communication, such as wireless communication, with the hearing device comprising an antenna and a wireless transceiver. The user accessory device may be a mobile device such as a portable communications device, e.g. a smartphone, a smartwatch, a tablet computer or another processing device or system. In particular, the user accessory device may be a mobile device such as a smartphone, tablet computer or the like, that includes a digital camera and a short-range wireless communications interface e.g. a Bluetooth communications interface.

The user accessory device forms an accessory device to the hearing device. The hearing device may be a hearing instrument or hearing aid, an earphone, a headset, etc. Generally, the hearing device may be a user-worn device, e.g. a head-device, such as a device worn at, behind and/or in a user's ear. In particular, in some embodiments, the hearing device may be a hearing aid configured to receive and deliver a hearing loss compensated audio signal to a user or patient via a loudspeaker. The hearing aid may be of the behind-the-ear (BTE) type, in-the-ear (ITE) type, in-the-canal (ITC) type, receiver-in-canal (RIC) type or receiver-in-the-ear (RITE) type. Typically, the hearing device and the user accessory device are in possession of, and controlled by, the hearing device user. Typically, only a severely limited amount of power is available from a power supply of a hearing device. For example, power is typically supplied from a conventional $ZnO_2$ battery in a hearing aid. In the design of a hearing device, the size and the power consumption are important considerations. The hearing device may comprise an input transducer, such as one or several microphones, configured to output an audio signal based on a signal applied to the input transducer and representing sound. The hearing device may comprise a processing unit for performing signal and/or data processing. In particular the processing unit may comprise a hearing loss processor configured to compensate a hearing loss of a user of the hearing device and output a hearing loss compensated audio signal. The hearing loss compensated audio signal may be adapted to restore loudness such that loudness of the applied signal as it would have been perceived by a normal listener substantially matches the loudness of the hearing loss compensated signal as perceived by the user. The hearing device may additionally comprise an output transducer, such as a receiver or loudspeaker, an implanted transducer, etc., configured to output an auditory output signal based on the hearing loss compensated audio signal that can be received by the human auditory system, whereby the user hears the sound.

The hearing device may comprise a wireless communications interface, e.g. comprising an antenna and a wireless transceiver. The wireless transceiver may comprise both a wireless transmitter and a wireless receiver. The transmitter and receiver may share common circuitry and/or a single housing. Alternatively, the transmitter and receiver may share no circuitry, and the wireless communication unit may comprise separate devices with the transmitter and the receiver, respectively. The wireless transceiver may be configured for radio communication, e.g. at frequencies in the range from 2.4 to 2.5 GHz, e.g. using Bluetooth, Bluetooth low energy, IEEE 802.11, Zigbee or the like. To this end, the processing unit may further comprise a communications controller configured to control operation of the communications interface, including the establishment of a communications link between the hearing device and a user accessory device. The communications link may be established based on an established trusted bond, e.g. established by a process as described herein.

The processing unit may be implemented as a single unit or as multiple separate units. In particular, signal and/or data processing in the hearing device may be performed by dedicated hardware or in one or more signal and/or data processors, or performed in a combination of dedicated hardware and one or more signal and/or data processors. Likewise, the operations performed by the communications controller may be performed by dedicated hardware or may be performed at least in part in one or more processors, or performed in a combination of dedicated hardware and one or more processors Embodiments of the methods and devices disclosed herein create a trusted bond between a hearing device and the user accessory device and/or a user application executed on the user accessory device, thus reducing the complexity of subsequent authentication procedure between the user accessory device and/or user application and the hearing device when a communications link is subsequently established between the user accessory device and the hearing device. The trusted bond between the hearing device and the user accessory device may be established as a shared authentication key, in particular a shared secret authentication key, that is shared between the hearing device and the user accessory device. Accordingly, once the shared authentication key is established it may be used for subsequent authentication, e.g. of the user accessory device by the hearing device. Hence, for the purpose of the present disclosure, establishing a trusted bond between two entities refers to the establishment of a shared authentication key between the two devices. In some embodiments, the trusted bond is established between the hearing device and a user application residing on and executable by the user accessory device. Embodiments of the process disclosed herein make the authentication key securely available to the user accessory device in a user-friendly manner. Moreover, embodiments of the process disclosed herein allow an association to be established between a user accessory device and the user of the hearing device.

Some embodiments of the process described herein may be used to establish a pairing of Bluetooth devices.

The machine-readable representation of the authentication data may be an optically readable code, such as a barcode, e.g. a 1- or 2-dimensional barcode, a matrix barcode, a QR code, a color code, a microdot code, a code perceptibly or imperceptibly embedded into an image, an IR readable code, etc. Accordingly, the user accessory device may include a code capturing device, e.g. a barcode reader, a digital camera, an IR reader, and/or the like etc.

The hearing device fitting system may thus provide the optically readable code in a variety of ways so as to allow the hearing device user to operate the user accessory device to capture the optically readable code. For example, the hearing device fitting system may output the optically readable code printed on a sheet of paper, on a label, on a card, on a part of the packaging for the hearing device and/or the like. Alternatively or additionally, the hearing device fitting system may display the optically readable code on a display, e.g. on a point-of-sale device, so as to allow the user to operate the user accessory device to directly capture the optically readable code.

Yet alternatively or additionally, the hearing device fitting system may electronically communicate the optically readable code to the user, e.g. by e-mail, via a social media platform, via a short message service, etc. Hence, the user himself/herself may print out the optically readable code or display the optically readable code on a display so as to allow the user accessory device to capture the optically readable code.

In some embodiments, the authentication data and/or the machine-readable representation of the authentication data may be provided in another form, e.g. as an RFID tag having stored thereon the authentication data, as a smart card having stored thereon the authentication data and/or in another suitable form.

Yet further, in some embodiments, the hearing device fitting system may communicate the authentication data to the user accessory device in a different manner, e.g. in digital form, e.g. as a link, such as a URL, to a location from which a user application can be retrieved and/or invoked. The link may include, e.g. as a parameter, the authentication data to be provided to the user application when the user application is installed and/or invoked on the user accessory device.

The present disclosure relates to different aspects including the method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of a hearing device fitting system comprising a processing unit and a communications interface; wherein the processing unit is configured to:

transmit, via the communications interface, an authentication key to a hearing device;

create authentication data comprising the authentication key in encrypted form, e.g. encrypted using the identification information identifying the hearing device, and provide a representation of the authentication data in a format readable by a user accessory device.

The communications interface may be a wired or wireless communications interface. The communications interface may comprise an antenna and a wireless transceiver, e.g. configured for wireless communication at frequencies in the range from 2.4 to 2.5 GHz. The interface may be configured for communication, such as wireless communication, with the hearing device comprising an antenna and a wireless transceiver.

For the purpose of the present description, the term "processing unit" comprises any suitably configured circuitry or device configured to perform the processing described herein to be performed by the processing unit. For example, the processing unit may be or comprise an ASIC processor, a FPGA processor, a suitably programmed general-purpose processor, a microprocessor, a circuit component, or an integrated circuit.

The hearing device fitting system may comprise an output interface for outputting the created authentication data in machine readable form. The output interface may comprise a printer for printing a machine-readable representation of the authentication data. Alternatively or additionally, the output interface may comprise a display for displaying a machine-readable representation of the authentication data. Alternatively or additionally, the output interface may comprise a wired or wireless communications interface for communicating the authentication data to an RFID tag, to a smart card, to a remote data processing system or device and/or the like. For example, the communications interface may comprise an RFID interface, a smart card interface, a network interface and/or the like.

According to another aspect, disclosed herein are embodiments of a user accessory device comprising a processing unit and a communications interface; wherein the processing unit is configured to:

obtain authentication data created by a hearing device fitting system, the authentication data comprising an authentication key in encrypted form;

receive, via the communications interface, identification information from the hearing device, the identification information identifying the hearing device;

decrypt the encrypted authentication key comprised in the obtained authentication data using at least the received identification information;

establish, via the communications interface, communication between the hearing device and the user accessory device based on the authentication key.

Different embodiments of the user accessory device may be configured to obtain the authentication data in one or more of a variety of ways, e.g. directly from the hearing device fitting system or indirectly, e.g. via a data carrier, a print carrier, etc. To this end the user accessory device may comprise an input interface for receiving the authentication data. The input interface may comprise a code capturing device, e.g. a barcode reader, a digital camera, an IR reader, and/or the like etc. configured to read or otherwise capture a machine-readable representation of the authentication data, e.g. a displayed representation displayed on a display, a printed representation on a sheet of paper or on another print carrier. Alternatively the input interface may include a communications interface configured to receive the authentication data in digital form, e.g. from an RFID tag, from a smart card, from a remote data processing system or device and/or the like. For example, the input interface may comprise an RFID reader, a smart card reader, a network interface and/or the like.

According to yet another aspect, disclosed herein are embodiments of a system comprising a hearing device, a user accessory device and a hearing device fitting system as described herein.

According to yet another aspect, disclosed herein are embodiments of a computer program product configured to cause, when executed by a hearing device fitting system, the hearing device fitting system to:

transmit, via a communications interface of the hearing device fitting system, an authentication key to a hearing device;

create authentication data comprising the authentication key in encrypted form, and provide a representation of the authentication data in a format readable by a user accessory device.

According to yet another aspect, disclosed herein are embodiments of a computer program product, in particular a user application, configured to cause, when executed by a user accessory device, the user accessory device to:

obtain authentication data created by a hearing device fitting system, the authentication data comprising an authentication key in encrypted form;

receive, via a communications interface of the user accessory device, identification information from the hearing, the identification information identifying the hearing device;

decrypt the encrypted authentication key comprised in the obtained authentication data using at least the received identification information;

establish, via the communications interface, communication between the hearing device and the user accessory device based on the authentication key.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

BRIEF DESCRIPTION OF THE DRAWINGS

In the following, preferred embodiments of the various aspects disclosed herein are described in more detail with reference to the appended drawings, wherein.

DETAILED DESCRIPTION OF EMBODIMENTS

Figure 1:
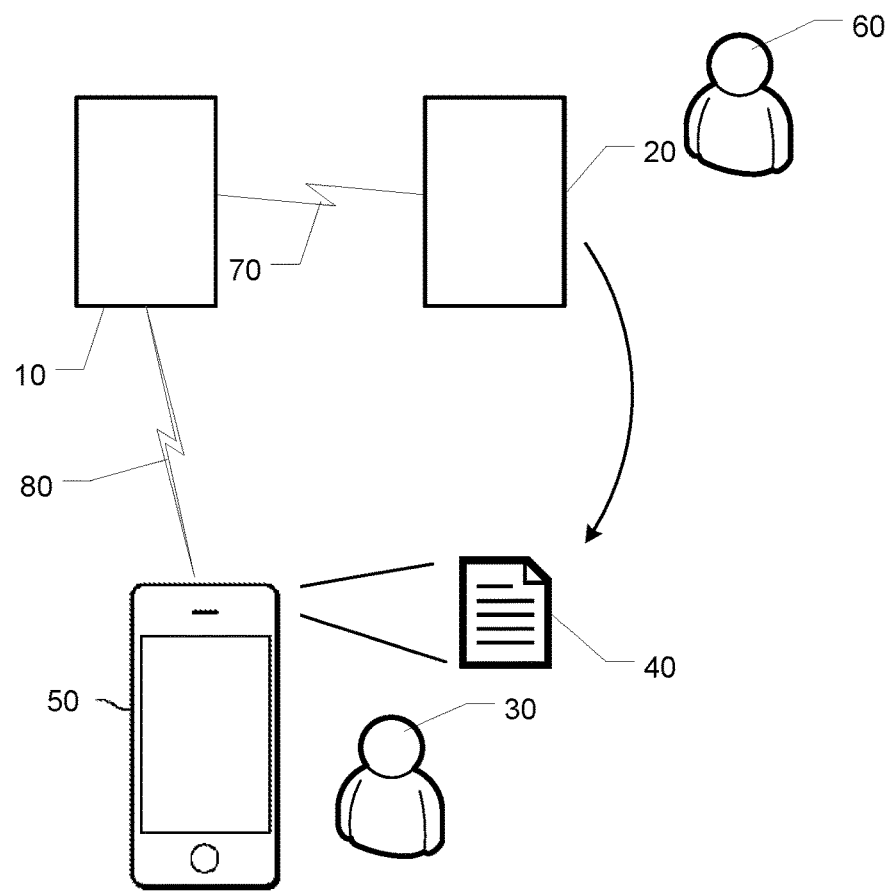
FIG. 1 schematically illustrates an embodiment of a system comprising a user accessory device, a hearing device and a hearing device fitting system.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

In the following, preferred embodiments of the various aspects disclosed herein are described in more detail in the context of hearing devices. In the following embodiments, the hearing device comprises a hearing aid as discussed in additional detail below.

FIG. 1 schematically illustrates an embodiment of a system. In particular, the system comprises a user accessory device 50, a hearing device 10 and a hearing device fitting system 20.

The hearing device 10 can be communicatively coupled to the user accessory device 50 via a wireless communications link 80. The hearing device 10 can also be communicatively coupled to the hearing device fitting system 20 via a wireless communications link 70. An example of a hearing device 10 will be described in more detail with reference to FIG. 2 below. While the embodiment of FIG. 1 only shows a single hearing device, it will be appreciated that other embodiments may include more than one hearing device, e.g. a pair of hearing devices including a left-ear hearing device and a right-ear hearing device.

In the present example, the user accessory device 50 is a smartphone. Other examples of user accessory devices include other types of mobile devices, such as a tablet computer, a smart watch, or other user accessory devices such as a TV-set, etc. An embodiment of a user accessory device will be described in more detail with reference to FIG. 3. The user accessory device 50 is typically a device operated by the user 30 of the hearing device 10. While the embodiment of FIG. 1 only shows a single user accessory device, it will be appreciated that other embodiments may include more than one user accessory device, e.g. when the user wishes to selectively connect respective user accessory device to the same hearing device. This may e.g. be the case when the user owns a smartphone as well as a tablet computer and/or other audio-enabled electronic devices, such as a smart TV or the like.

Wireless communication between the hearing device 10 and the hearing device fitting system 20 and/or wireless communication between the hearing device 10 and the user accessory device 50 may be performed via the 2.4 GHz industrial scientific medical (ISM) band which may comprise a number of spaced apart frequency bands or channels. Each of the spaced apart frequency bands or channels may possess a bandwidth between 0.5-2.0 MHz such as about 1.0 MHz. The user accessory device 50 and/or the hearing device fitting system 20 may be configured to communicate with the hearing device 10 in accordance with Bluetooth Low Energy (Bluetooth LE) for example according to the Bluetooth Core Specification Version 4.1, 4.2 or 5. Nevertheless, the hearing device 10 and the user accessory device 50 are configured to establish a communications link 80 based on a trusted bond established between the user accessory device 50 and the hearing device 10, in particular based on a pair of authentication keys shared by the user accessory device 50 and the hearing device 10, respectively. An embodiment of a process for establishing the trusted bond will be described in greater detail below.

The hearing device fitting system 20 may be or comprise a suitably programmed computer, such as a desktop computer, a laptop computer, a tablet computer, or the like. The computer may have stored thereon a hearing device fitting software. Typically, the hearing device fitting system is operated by a hearing care professional (HCP) 60, e.g. a dispenser, an audiologist etc. An example of a hearing device fitting system will be described in more detail below with reference to FIG. 4.

Figure 2:
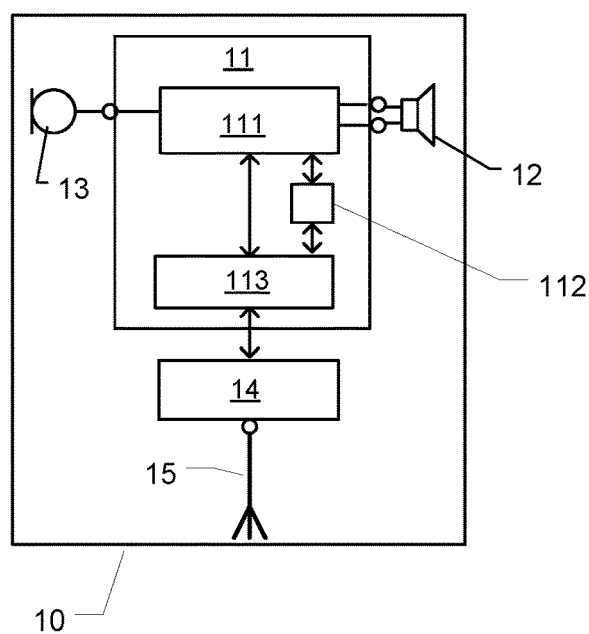
FIG. 2 illustrates a block diagram of an example of a hearing device.

FIG. 2 illustrates a block diagram of an example of a hearing device, such as a hearing aid. The hearing device, generally designated by reference numeral 10, may comprise a $ZnO_2$ battery or other suitable battery (not shown) that is connected for supplying power to the electronic components of the hearing device. The hearing device 10 comprises an input transducer in the form of a microphone 13, a processing unit 11 and loudspeaker or receiver 12. The microphone 13 outputs an analogue or digital audio signal based on an acoustic sound signal arriving at the microphone 13 when the hearing device 10 is operating. If the microphone 13 outputs an analogue audio signal the processing unit 11 may comprise an analogue-to-digital converter (not shown) which converts the analogue audio signal into a corresponding digital audio signal for digital signal processing in the processing unit 11. The processing unit 11 comprises a hearing loss processor 111 that is configured to compensate a hearing loss of a user of the hearing device 10. Preferably, the hearing loss processor 111 comprises a dynamic range compressor well-known in the art for compensation of frequency dependent loss of dynamic range of the user often termed recruitment in the art. Accordingly, the hearing loss processor 111 outputs a hearing loss compensated audio signal to the loudspeaker or receiver 12. The loudspeaker or receiver 12 converts the hearing loss compensated audio signal into a corresponding acoustic signal for transmission towards an eardrum of the user. Consequently, the user hears the sound arriving at the microphone 13 but compensated for the user's individual hearing loss. The hearing device may be configured to restore loudness, such that loudness of the hearing loss compensated signal as perceived by the user wearing the hearing device 10 substantially matches the loudness of the acoustic sound signal arriving at the microphone 13 as it would have been perceived by a listener with normal hearing.

The hearing device 10 further includes a wireless communications unit which comprises an antenna 15 and a radio portion or transceiver 14 that is configured to communicate wirelessly with the hearing device fitting system 20 and that is configured to wirelessly communicate with user accessory device 50.

The processing unit 11 comprises a communications controller 113 configured to perform various tasks associated with the communications protocols and possibly other tasks. In particular, the communications controller 113 may be configured to establish a secure communications link with a user accessory device based on a shared authentication key that represents a trusted bond between the hearing device 10 and the user accessory device 50.

To this end, the processing unit comprises a memory 112 for storing one or more authentication keys. In particular, the memory may be configured to store a plurality of authentications keys representing respective trusted bonds with different user accessory devices. The authentication keys may be stored in the form of an indexed list or otherwise in a form where each authentication key has associated with it a respective authentication key index. It will be appreciated that the memory 112 may further be configured to store other data, such as operational parameters for use by the hearing device, e.g. operational parameters for use by the hearing loss processor 111.

Even though the hearing loss processor 111 and the communications controller 113 are shown as separate blocks in FIG. 2, it will be appreciated that they may completely or partially be integrated into a single unit. For example, the processing unit 11 may comprise a software programmable microprocessor such as a Digital Signal Processor which may be configured to implement the hearing loss processor and/or the communications controller 113 or parts thereof. The operation of the hearing device 10 may be controlled by a suitable operating system executed on the software programmable microprocessor. The operating system may be configured to manage hearing device hardware and software resources, e.g. including the hearing loss processor 111 and possibly other processors and associated signal processing algorithms, the wireless communications unit, memory resources etc. The operating system may schedule tasks for efficient use of the hearing device resources and may further include accounting software for cost allocation, including power consumption, processor time, memory locations, wireless transmissions, and other resources. The operating system controls, including or in cooperation with the communications controller 113, the radio transceiver 14 to perform wireless communication with a hearing device fitting system or with the user accessory device 50 in accordance with the present methodology. The user accessory device 50 may operate as a master device and the hearing device 10 as a slave device in connection with bi-directional data communication between the devices under the audio-enabled Bluetooth LE protocol.

Also, even though the memory 112 is shown as part of the processing unit 11, it will be appreciated that the memory may be implemented as a separate unit communicatively coupled to the processing unit 11.

Figure 3:
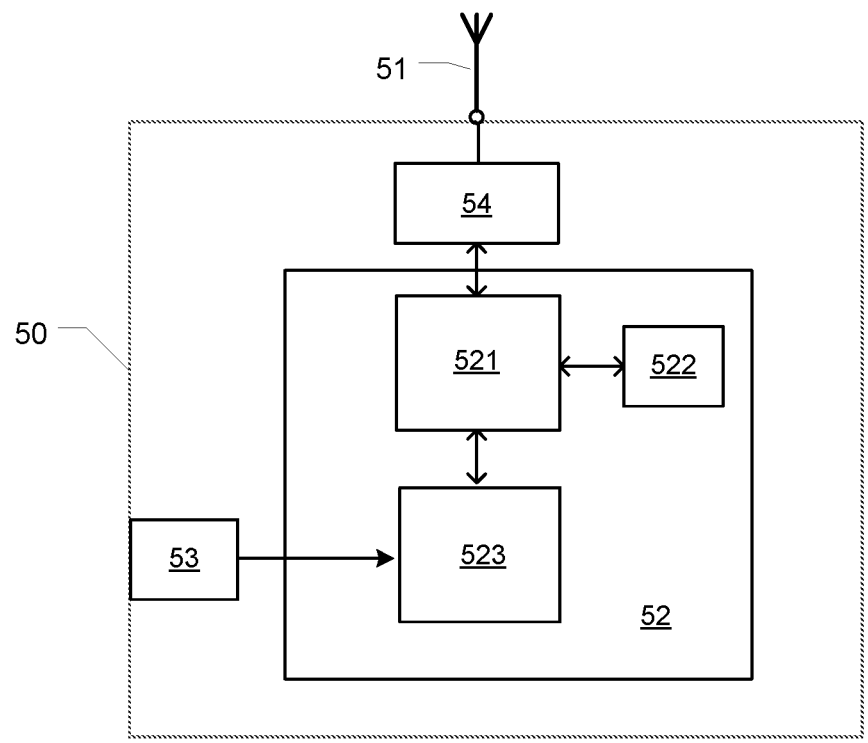
FIG. 3 illustrates a schematic block diagram of an example of a user accessory device.

FIG. 3 illustrates a schematic block diagram of an example of a user accessory device. The user accessory device 50 comprises an antenna 51 and a radio portion or circuit 54 that is configured to communicate wirelessly via antenna 51 with the corresponding radio portion or circuit of the hearing device, e.g. hearing device 10 of FIG. 1. The user accessory device 50 also comprises a processing unit 52 which comprises a communications controller 521, a memory 522 and a central processing unit 523. The communications controller 521 may e.g. be a Bluetooth LE controller. The communications controller 521 may be configured for performing the various communication protocol related tasks, e.g. in accordance with the audio-enabled Bluetooth LE protocol, and possibly other tasks. In particular, the communications controller 521 may be configured to establish a secure communications link with a hearing device based on a shared authentication key that represents a trusted bond between the hearing device and the user accessory device 50.

To this end, the user accessory device comprises a memory 522 for storing one or more authentication keys. In particular, the memory 522 may be configured to store a plurality of authentications keys establishing respective trusted bonds with different hearing devices. The authentication keys may be stored in the form of a list or otherwise in a form where each authentication key has associated with it information identifying a hearing device and further data, such as an authentication key index. It will be appreciated that the memory 522 may further be configured to store other data, such as operational parameters for use by the user accessory device. Also, even though the memory 522 is shown as part of the processing unit 52, it will be appreciated that the memory may be implemented as a separate unit communicatively coupled to the processing unit 52.

The user accessory device 50 further comprises a reader 53 communicatively coupled to the central processing unit. The reader 53 may comprise a digital camera, a barcode reader, and RFID tag reader, a smart card reader or the like which is configured to read a machine-readable representation of the authentication data.

The user accessory device may be a suitably programmed smartphone, tablet computer, smart TV or other electronic device, such as audio-enabled device. The user accessory device may be configured to execute a user application, such as an app or other form of application software. The user accessory device may be configured to exchange audio data with a hearing device and/or control data for controlling function the hearing device and/or the like. To this end, audio or other data packets or data sets for transmission via RF antenna 51 over a wireless communications links to a hearing device may be supplied by the central processing unit 523, e.g. under control of a suitable user application executed by the central processing unit 523, to the communications controller. The communications controller 56 may provide the audio or data packets to the radio circuit 54. Similarly, data packets received by the radio portion or circuit 54 via RF antenna 51 are forwarded to the communications controller 521 and further to the central processing unit 523 for further data processing. The skilled person will appreciate that the user accessory device 50 typically will include numerous additional hardware and software resources in addition to those schematically illustrated as is well-known in the art of mobile phones.

Figure 4:
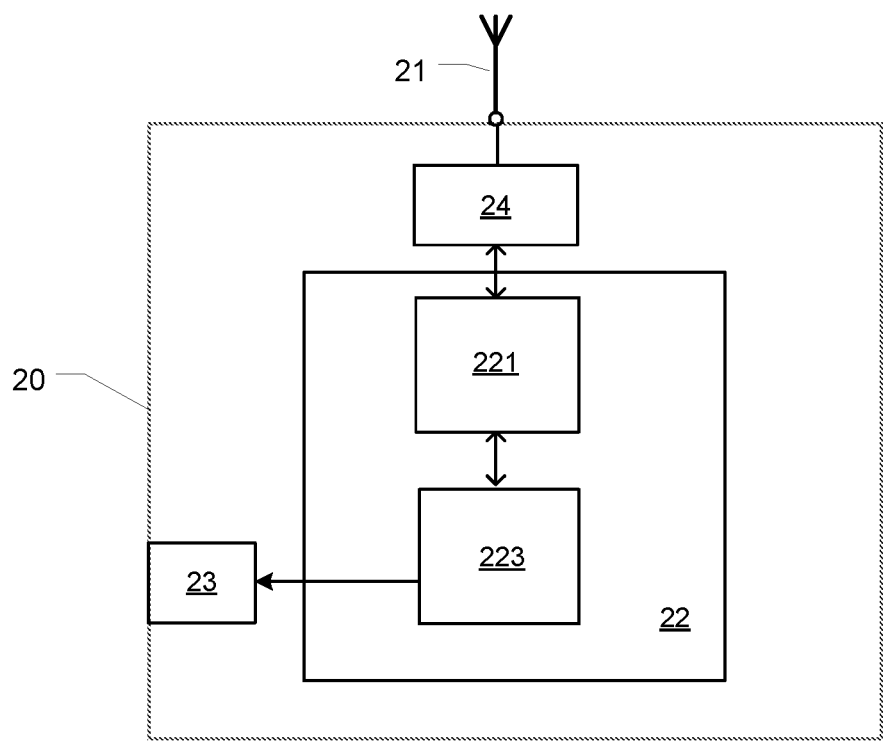
FIG. 4 illustrates a schematic block diagram of an example of a hearing device fitting system.

FIG. 4 illustrates a schematic block diagram of an example of a hearing device fitting system. The hearing device fitting system 20 comprises an antenna 21 and a radio portion or circuit 24 that is configured to communicate wirelessly via antenna 21 with the corresponding radio portion or circuit of the hearing device, e.g. hearing device 10 of FIG. 1. The hearing device fitting system 20 also comprises a processing unit 22 which comprises a communications controller 221, a memory 222 and a central processing unit 223. The communications controller 221 may e.g. be a Bluetooth LE controller. The communications controller 221 may be configured for performing the various communication protocol related tasks and possibly other tasks. In particular, the communications controller 221 may be configured to establish a secure communications link with a hearing device and to transmit operational parameters and an authentication key to the hearing device and to receive data from the hearing device.

The hearing device fitting system 20 further comprises an output device 23 communicatively coupled to the central processing unit 223. The output device is configured to output a machine-readable representation of authentication data created by the hearing aid fitting system. The output device may e.g. comprise a printer, a display, a communications interface, etc.

The hearing device fitting system may be a suitably programmed computer, such as a desktop computer or a laptop computer. The computer may be configured to execute a hearing device fitting software configured to allow a hearing care professional to configure and/or adjust a hearing device for use of the hearing device by a hearing device user. To this end, data packets or data sets for transmission via RF antenna 21 over a wireless communications links to a hearing device may be supplied by the central processing unit 223, e.g. under control of a suitable hearing device fitting software executed by the central processing unit 223, to the communications controller. The communications controller 26 may provide the data packets to the radio circuit 24. Similarly, data packets received by the radio portion or circuit 24 via RF antenna 21 are forwarded to the communications controller 221 and further to the central processing unit 223 for further data processing and/or storage. The skilled person will appreciate that the hearing device fitting system 20 typically will include numerous additional hardware and software resources in addition to those schematically illustrated as is well-known in the art of computers and hearing device fitting.

Figure 5:
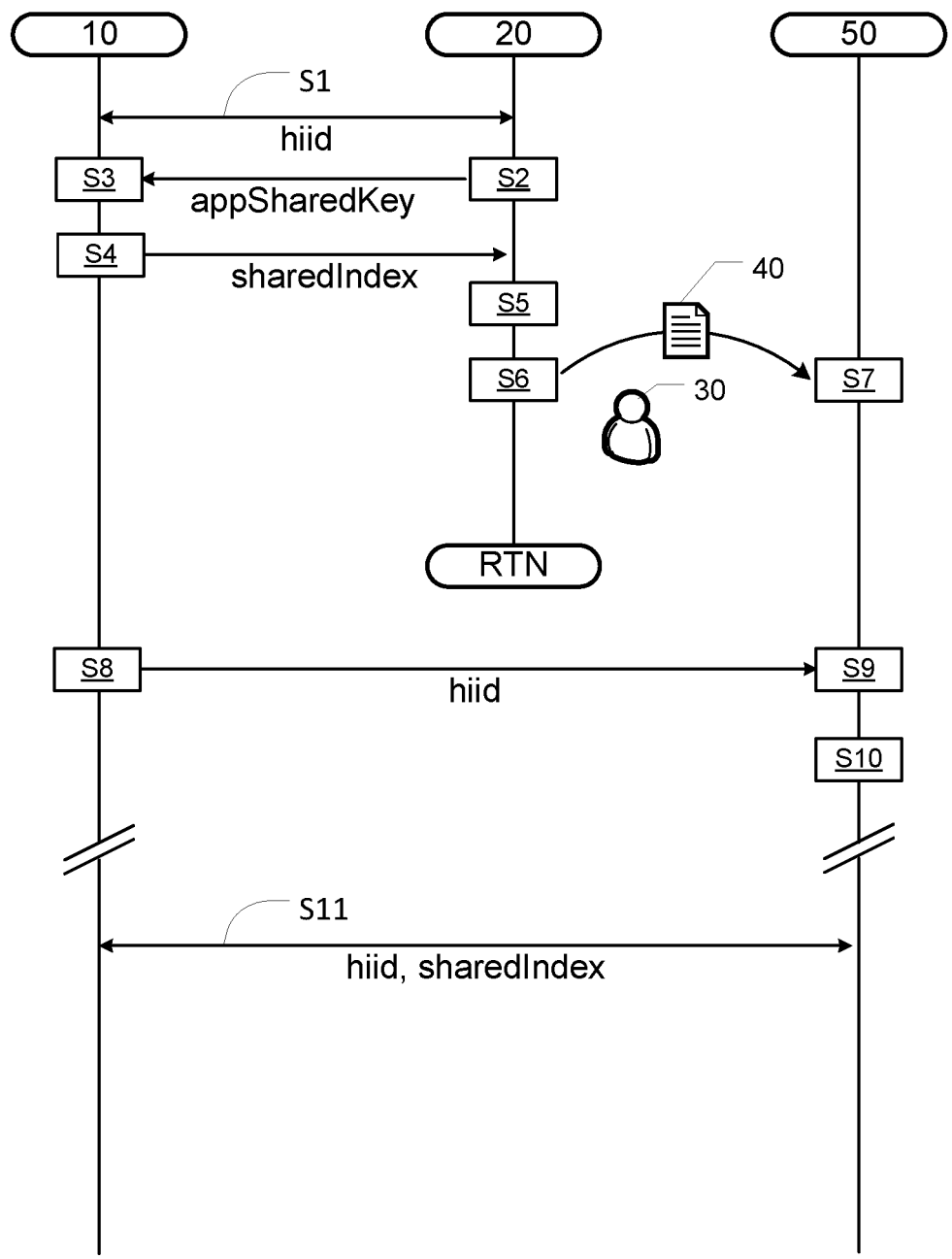
FIG. 5 illustrates an example of a process for establishing a trusted bond between a hearing device and a user accessory device.

With reference to FIG. 5, and with continued reference to FIGS. 1-4, an example of a process for establishing a trusted bond between a hearing device and a user accessory device will now be described. The process may be carried out by the system of FIG. 1 or a similar system including a hearing device, a user accessory device and a hearing device fitting system. The process may be performed as part of the fitting process where a hearing care professional fits the hearing device to a particular user.

During the fitting process, in initial step S1, the hearing device fitting system 20 may establish a communications link 70 with the hearing device 10. The communications link may be a wireless communications link, such as a Bluetooth LE communications link or a wireless communications link using another suitable wireless communications technology. Alternatively, the communication between the hearing device fitting system and the hearing device may be a wired connection, e.g. via a suitable cable. The communications link may be cryptographically protected so as to ensure secure exchange of data. During this step, the hearing device 10 transmits a hearing device identifier, hiid, to the hearing device fitting system. The hearing device identifier may be a serial number or another identifier which may uniquely identify the hearing device 10.

During the fitting process, the hearing device fitting system may transmit one or more operational parameters to the hearing device for storage in a memory 112 of the hearing device. Examples of such operational parameters may comprise fitting parameters such as hearing loss parameters, compressor parameters, filter coefficients, and/or gain coefficients, and/or the like.

In particular, in step S2, the hearing device fitting system 20 transmits an authentication key to the hearing device 10 via the established communications link 70 for storage of the authentication key in the memory 112 of the hearing device. To this end, the hearing device fitting system may create the authentication key. For example, the hearing device fitting system may create the authentication key as a fixed length key, e.g. a 32 byte key. The authentication key may e.g. be created as a sequence of random bytes. In some embodiments, the hearing device fitting system may create a unique authentication key, e.g. by ensuring that each random byte sequence is only created once. This may even be enforced globally when the hearing device fitting system is in communicative communication, e.g. via the internet or another communications network, with a remote host system, e.g. a key server or a key verification server. For the purpose of the present description, the authentication key will also be referred to as appSharedKey.

In step S3, the authentication key is stored in a memory 112 of the hearing device 10, e.g. in a dedicated memory portion configured for storage of security items. The hearing device 10 may store the authentication key in association with an authentication key index. For example, the hearing device may have stored thereon an indexed list or array of respective authentication keys, each authentication key having associated with it a corresponding authentication key index which identifies the authentication key within the list. Accordingly, the authentication key index may not need to be globally unique but merely adapted to identify an authentication key among the authentication keys stored by the hearing device. The authentication index will also be referred to as sharedIndex.

In step S4, the hearing device 10 thus returns the authentication key index which is associated with the authentication key received from the hearing device fitting system back to the hearing device fitting system.

In step S5, the hearing device fitting system 20 creates authentication data. In one embodiment, the authentication data is in the form of a fixed length byte code, e.g. a 70 byte long code.

Figure 6:
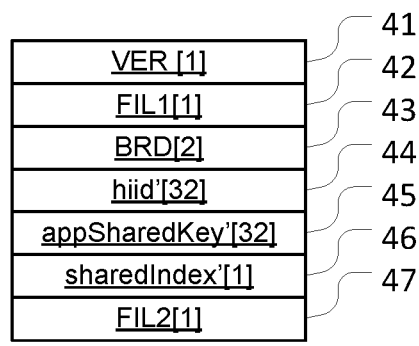
FIG. 6 shows an example of the data format of the authentication data.

FIG. 6 shows an example of the data format of the authentication data created by the hearing device fitting system. The authentication data comprises a version field 41. The version field may be 1 byte long or have another suitable length. The version field identifies the version of the data format, i.e. it allows the user accessory device to identify which format of data to expect in the following fields, thus facilitating proper decoding of the authentication data. Newer versions might change either the expected length or the content/format of the data to follow.

The authentication data further comprises a first filler or padding field 42 which may have a predetermined content, e.g. be set to zero. The filler field may be 1 byte long or have another suitable length. In some embodiments, the filler field may be omitted.

The authentication data further comprises a "brand" field 42 which includes information about the brand or type of hearing device. The "brand" field may be 2 bytes long or have another suitable length. This information may e.g. be used by the user accessory device to determine whether the hearing device is supported by the user application executed on the user accessory device and/or the like.

The authentication data further includes a hash value hiid' 44 of the hearing device identifier hiid. The hash value may e.g. be calculated as iid'=HASH(hiid|static string)

where the static string may be a predetermined string, e.g. in UTF8 format, and where HASH(•) is a suitable cryptographic hash function, e.g. SHA-2. The hiid' may be 32 bytes long or have another suitable length. In alternative embodiments, the hash function may be computed from the hearing device identifier hiid alone or in combination with a variable string. For example, the hash function may be computed from the hearing device identifier and a key or other data item stored in the hearing device and known to the hearing device manufacturer. In this case, the hearing device may transmit the value of hiid' to the hearing device fitting system during the fitting process, e.g. as part of step S4 of the process of FIG. 5 to allow the hearing device fitting system to include the value into the authentication data without requiring knowledge of the key or other data item. The value hiid' included in the authentication data provided to the user accessory device may subsequently be used by the user accessory device in order to identify the hearing device to which the authentication data pertains when the hearing device is within communication range of the user accessory device, e.g. as will be described below. It is an advantage that the authentication data does not need to include any data that directly identifies the hearing device to which the authentication data pertains. The authentication data can only be used to identify the right hearing device when the hearing device is within communication range of the user accessory device and communicates its hearing device identifier.

The authentication data further comprises the authentication key 45 in encrypted form, also referred to as appSharedKey'. The appSharedKey' may be 32 bytes long or have another suitable length. The authentication key may be encrypted using a suitable encryption process, e.g. AES in counter mode. To this end, the encryption key and counter for use in the AES encryption may be computed as HASH (hiid | static string), where HASH is a suitable cryptographic hash function such as SHA-2 and where static string is a suitable byte sequence such as a predetermined string, e.g. in UTF8 format. The static string used for computing the AES encryption key and counter is preferably different from the static string used for the computation of hiid'. The first 16 bytes of the result value of the above hash operation may used as encryption key and the remaining 16 bytes may be used as counter. The last 4 bytes in the counter may be prefixed with 0,0,0,1 or another suitable sequence. It will be appreciated that another type of encryption may be used and/or that the encryption key depends on the hearing device identifier in another way.

The authentication data further comprises the authentication key index sharedIndex, preferably in encrypted form. The encrypted sharedIndex will also be referred to as sharedIndex'. The sharedIndex' may be 1 byte long or have another suitable length. The authentication key index may be encrypted using a suitable encryption process, e.g. using the same encryption method, key and counter as described in connection with the encryption of the encryption key.

Accordingly, if an unauthorized person finds a piece of paper with a QR code or another machine-readable representation of the authentication data, that person will not be able to guess the hiid of the hearing device for which the authentication is generated. Therefore that person will not be able to calculate the decryption key for the appSharedKey and sharedIndex. This requires access to the hearing device, e.g. to be within its communication range.

The authentication data further comprises a second filler or padding field 47 which may have a predetermined content, e.g. be set to zero. The filler field may be 1 byte long or have another suitable length. In some embodiments, the filler field may be omitted.

It will be appreciated that, in other embodiments, the authentication data may have a different format. In particular, the various fields may have different lengths and/or may be arranged in a different order or structure. Moreover, the authentication data may include alternative or additional fields. For example, some embodiments of authentication data may not include a version field and/or not include a brand field and/or not include filler fields and/or include other filler fields. In some embodiments, the sharedIndex may be included unencrypted and/or other modifications may be applied.

Figure 7:
FIG. 7 shows an example of machine-readable code encoding two sets of authentication data.

Again referring to FIG. 5, in step S5, the hearing device fitting system further creates a machine-readable, such as particular an optically readable, representation of the authentication data. For example, the hearing device fitting system may create a matrix code, such as a QR code encoding the authentication data. In some embodiments, the hearing device fitting system may create a machine readable representation that represents two sets of authentication data, e.g. one set for each hearing device of a pair of hearing device. This allows a user accessory device to establish a trusted bond with a pair of hearing devices in a single operation. An example of a QR code encoding two sets of authentication data is shown in FIG. 7.

Still referring to FIG. 5, in subsequent step S6, the hearing device fitting system provides the created representation 40 to the hearing device user 30 in a form that can be read by the user accessory device. For example, the hearing device fitting system may print the machine-readable representation on a sheet of paper or on another suitable carrier. Alternatively or additionally, the hearing device fitting system may display the created machine-readable representation on a display associated with the hearing device fitting system. Yet alternatively or additionally, the hearing device fitting system may send the created machine-readable representation, e.g. as an image, to the user by e-mail, short message service or in another suitable manner.

In any event, in step S7 the machine-readable representation of the authentication data is read by the user accessory device 50, e.g. by means of a built-in digital camera of the user accessory device. To this end, the user may invoke a user application, e.g. an app, on the user accessory device that includes functionality for reading the machine-readable representation. Alternatively, the machine readable representation may additionally include a reference to the user application and, optionally, to a source from which the user application may be obtained, e.g. an app store. Accordingly, the user 30 may control the user accessory device 50 to read the machine-readable representation 40 causing the user accessory device to invoke or, if required, to retrieve from the identified source and then invoke, the user application on the user accessory device. When invoked, the user application may cause the user accessory device to perform the further steps of the bond creation to be executed by the user accessory device.

The provision of the representation of the authentication data as an optically readable code on a sheet of paper or other carrier or on a display requires a minimum of additional infrastructure as a part of the hearing device fitting system. Also, many mobile devices include a digital camera and are able to read optically readable codes in a user-friendly manner. Nevertheless, it will be appreciated that the authentication data may be provided to the user accessory device in a another form, e.g. by direct data transmission, via e-mail, short-message service, stored on a suitable storage medium such as an RFID tag, a smart card or the like.

In step S8, when the user accessory device 50 is in sufficient proximity of the hearing device 10 to be within communication range of the hearing device, the hearing device communicates its hearing device identifier hiid to the user accessory device. For example, the hearing device may, when operated in a mode where it can communicate via its wireless communications interface, e.g. via Bluetooth LE, broadcast its hearing device identifier such that other devices can detect the hearing device and establish a connection with it.

In step S9, the user accessory device 50 computes a cryptographic hash value HASH(hiid | static string) from the hearing device identifier hiid received from the hearing device 10. To this end, the user application may include, or otherwise have access to, the static string to be used to compute the hash function. Similarly, if another data item was used to create hiid', the user accessory device may include, or otherwise have access to, such data item. The user accessory device then compares the computed hash value with the value hiid' included in the read authentication data. If the two values are equal, the user accessory device determines that the hearing device from which it has received the hearing device identifier is the hearing device to which the authentication data pertains. In particular, for the purpose of this determination, the authentication data does not need to include the identifier of the hearing device but only a cryptographic hash value computed from it. If there are multiple hearing devices within communication range of the user accessory device and the user accessory device receives multiple hearing device identifiers, the user accessory device may calculate the respective hash values for the different received hearing device identifiers until the user accessory device has determined the hearing device identifier that matches the hash value hiid' from the authentication data.

Accordingly, when the user accessory device has identified the matching hearing device, in subsequent step S10, the user accessory device computes the decryption key and counter value to be used for decrypting the appSharedKey from appSharedKey' of the authentication data. In particular, as the user accessory device now knows the applicable hearing device identifier hiid, the user accessory device may compute HASH(hiid | static string) to compute the decryption key and counter, where the input to the hash function may include a static string different from the one used for computing hiid', as described above. Again, to this end, the user application may include or otherwise have access to the static string to be used for this computation. The user accessory device then computes the decrypted authentication key appSharedKey using the computed decryption key and counter. Similarly, the user accessory device decrypts, using the hearing device identifier, the authentication key index sharedIndex from the encrypted value sharedIndex' included in the authentication data. The user accessory device then stores the decrypted appSharedKey in association with the hearing device identifier and the decrypted sharedIndex for future use. Now the hearing device and the user accessory device share the authentication key and the user accessory device also knows which authentication key index the hearing device uses to identify the appropriate authentication key. The shared authentication key thus provides a trusted bond between the hearing device and the user accessory device.

Accordingly, when the hearing device and the user accessory device subsequently establish a connection (step S11) they can use the now established shared authentication key to secure the communications link between them by known mechanisms for authentication and/or encryption. In particular, the hearing device may broadcast its hearing device identifier hiid, and the user accessory device may send a connection request to the hearing device including the authentication key index associated with its stored authentication key for that hearing device. The hearing device may thus select its authentication key associated with the authentication key index and the devices may establish a secured connection based on the shared authentication key.

For example, the hearing device may authenticate the user accessory device. To this end, the hearing device may transmit a byte sequence, e.g. a random byte sequence, as a challenge to the user accessory device, the user accessory device may return a response computed as a cryptographic hash value computed from the authentication key of the accessory device and from the challenge. The hearing device may perform the same computation using its own authentication key and the challenge. If the result computed is equal to the response received from the user accessory device, the hearing device may determine that the user accessory device is in possession of the shared authentication key and it may thus determine to trust the user accessory device; otherwise the hearing device may terminate the session.

It will be appreciated that the establishment of a connection may also include an authentication of the hearing device by the user accessory device and/or the establishment of a session key for encrypting messages exchanged between the user accessory device and the hearing device.

In one embodiment, the authentication process comprises the following acts:

The user application executed on the user accessory device requests the hiid and a challenge from the hearing device. The challenge may be a 16 byte string or another suitable data item, e.g. a string of different length.

The hearing device forwards the hiid and the challenge to the user accessory device.

The user application executed on the user accessory device calculates one or more session keys to be used for securing the communications link to be established with the hearing device. The session keys may be calculated using the received challenge and the appSharedKey stored by the user accessory device for the hiid. The session keys may further be based on additional data. In particular, the user accessory device may computed a common secret from the received challenge and from the appSharedKey and, optionally, from additional data. The user accessory device may then calculate one or more session keys from the common secret. The user application further calculates a response to the received challenge using its stored appSharedKey for the hiid. For example, the response may comprise a predetermined string encrypted with one of the session keys which in turn depend on the appSharedKey.

The user accessory device sends an authentication message to the hearing device, the authentication message comprising the sharedIndex corresponding to the appSharedKey used by the user accessory device and the calculated response. The authentication message may include additional data.

The hearing device loads the appSharedKey corresponding to the received sharedIndex from its memory, calculates the common secret and corresponding session keys. The hearing device then verifies the response, e.g. by decrypting the encrypted string using its own session key and by comparing the decrypted string with the expected, predetermined string.

If the verification fails, the hearing device refuses the establishment of a secure link and may return an error message to the user accessory device. If the verification is successful, the hearing device returns an authentication response indicating successful authentication.

The hearing device and the user accessory device may now use the created session keys for securing communication between them until the connection is terminated.

Although the above embodiments have mainly been described with reference to certain specific examples, various modifications thereof will be apparent to those skilled in art without departing from the spirit and scope of the invention as outlined in claims appended hereto. For example, while the various aspects disclosed herein have mainly been described in the context of hearing aids, they may also be applicable to other types of hearing devices. Similarly, while the various aspects disclosed herein have mainly been described in the context of a Bluetooth LE short-range RF communication between the devices, it will be appreciated that the communications between the devices may use other communications technologies, such as other wireless or even wired technologies. The specification and drawings are, accordingly to be regarded in an illustrative rather than restrictive sense. The claimed invention is intended to cover all alternatives, modifications, and equivalents.

The invention claimed is:

1. A method of creating a trusted bond between a hearing device and a user accessory device, the hearing device having an authentication key transmitted by a hearing device fitting system, the method comprising:
    obtaining, by the user accessory device, authentication data, wherein the authentication data is created by the hearing device fitting system, and wherein the authentication data comprises the authentication key in encrypted form;
    receiving, by the user accessory device, identification information from the hearing device, the identification information identifying the hearing device;
    decrypting, by the user accessory device, the encrypted authentication key comprised in the obtained authentication data using at least the received identification information; and
    establishing communication with the hearing device based on the authentication key.

2. The method according to claim 1, wherein the encrypted authentication key comprised in the authentication data is encrypted based on the identification information identifying the hearing device.

3. The method according to claim 1, wherein the authentication key is for storage in the hearing device in association with an authentication key index.

4. The method according to claim 3, wherein the authentication data comprises the authentication key index.

5. The method according to claim 1, wherein the authentication data further comprises identifier verification data configured to allow the user accessory device to verify whether the identification information received from the hearing device matches at least a part of the authentication data.

6. The method according to claim 5, wherein the identifier verification data comprises a result value of a cryptographic hash function of an input that includes at least a part of the identification information.

7. The method according to claim 5, further comprising verifying, by the user accessory device, based on the received identification information and the identifier verification data, that the obtained authentication data pertains to the received identification information;
    wherein the encrypted authentication key is decrypted if a result from the act of verifying indicates a successful verification.

8. The method according to claim 7, wherein the act of verifying comprises:
    computing a result value of a cryptographic hash function of an input that includes at least a part of the identification information;
    comparing the computed result value with the identifier verification data; and
    determining that a verification is successful if the computed result value matches the identifier verification data.

9. The method according to claim 1, wherein the encrypted authentication key included in the authentication data is configured to be decrypted using a decryption key that depends on the identification information.

10. The method according to claim 9, wherein the decryption key is a result value of a cryptographic hash function computed from an input that includes at least a part of the identification information.

11. The method according to claim 1, wherein the authentication data includes version information indicative of a version of a data format of the authentication data.

12. The method according to claim 1, wherein the authentication data includes information identifying a user application to be installed on the user accessory device.

13. The method according to claim 1, wherein the authentication data is obtained from the hearing device fitting system by the user accessory device in a form readable by the user accessory device.

14. The method according to claim 1, wherein the act of obtaining the authentication data by the user accessory device comprises reading a machine-readable representation of the authentication data, and extracting the authentication data from the machine-readable representation.

15. The method according to claim 14, wherein the machine-readable representation of the authentication data comprises an optically readable code.

16. The method according to claim 1, wherein the act of receiving the identification information from the hearing device is performed by the user accessory device when the hearing device and the user accessory device are within a communication range from each other.

17. A hearing device fitting system comprising:
    a processing unit; and
    a communication interface;
    wherein the processing unit is configured to transmit, via the communication interface, an authentication key to a hearing device;
    wherein the processing unit is configured to create authentication data comprising the authentication key in encrypted form; and
    wherein the processing unit is configured to provide a representation of the authentication data in a format readable by a user accessory device.

18. A user accessory device comprising:
    a processing unit; and a communication interface;
wherein the processing unit is configured to obtain authentication data created by a hearing device fitting system, the authentication data comprising an encrypted authentication key;
wherein the processing unit is configured to receive, via the communication interface, identification information from a hearing device, the identification information identifying the hearing device;
wherein the processing unit is configured to decrypt the encrypted authentication key comprised in the authentication data using at least the received identification information; and
wherein the processing unit is configured to establish, via the communication interface, communication with the hearing device based on the authentication key.

19. A computer program product having a set of instructions, which when executed by a processing unit of a hearing device fitting system, will cause the hearing device fitting system to perform a method, the method comprising:
transmitting, via a communication interface of the hearing device fitting system, an authentication key to a hearing device;
creating authentication data comprising the authentication key in encrypted form; and
providing a representation of the authentication data in a format readable by a user accessory device.

20. A computer program product having a non-transitory medium storing a set of instructions, which when executed by a processing unit of a user accessory device, will cause the user accessory device to perform a method, the method comprising:
obtaining authentication data created by a hearing device fitting system, the authentication data comprising an encrypted authentication key;
receiving, via a communication interface of the user accessory device, identification information from a hearing device, the identification information identifying the hearing device;
decrypting the encrypted authentication key comprised in the authentication data using at least the received identification information; and
establishing, via the communications interface, communication with the hearing device based on the authentication key.

* * * * *